United States Patent
Haun

(10) Patent No.: US 9,538,706 B2
(45) Date of Patent: Jan. 10, 2017

(54) ZERO TURN MOWER STEERING SYSTEM

(71) Applicant: Deere & Company, Moline, IL (US)

(72) Inventor: Robert D. Haun, Fuquay Varina, NC (US)

(73) Assignee: DEERE & COMPANY, Moline, IL (US)

(*) Notice: Subject to any disclaimer, the term of this patent is extended or adjusted under 35 U.S.C. 154(b) by 94 days.

(21) Appl. No.: 14/689,254

(22) Filed: Apr. 17, 2015

(65) Prior Publication Data

US 2016/0302356 A1    Oct. 20, 2016

(51) Int. Cl.
| | |
|---|---|
| *B60K 17/30* | (2006.01) |
| *A01D 34/86* | (2006.01) |
| *B62D 1/12* | (2006.01) |
| *B62D 5/06* | (2006.01) |
| *A01D 101/00* | (2006.01) |

(52) U.S. Cl.
CPC .............. *A01D 34/86* (2013.01); *B62D 1/12* (2013.01); *B62D 5/064* (2013.01); *A01D 2101/00* (2013.01)

(58) Field of Classification Search
CPC .......... A01D 34/86; B62D 1/12; B62D 6/001; B62D 6/002; B62D 6/04
USPC .......... 180/6.28, 6.32, 6.44, 6.48; 280/93.51, 280/91.1, 98, 99, 771
See application file for complete search history.

(56) References Cited

U.S. PATENT DOCUMENTS

| | | | |
|---|---|---|---|
| 6,725,954 B1* | 4/2004 | Keane | B62D 11/12 180/6.48 |
| 6,904,985 B2 | 6/2005 | Ferree et al. | |
| 7,237,629 B1 | 7/2007 | Bland et al. | |
| 7,634,953 B2 | 12/2009 | Hoffman et al. | |
| 7,686,107 B1 | 3/2010 | Bland et al. | |
| 7,992,659 B2 | 8/2011 | Schaedler et al. | |
| 8,011,458 B2 | 9/2011 | Hauser | |
| 8,011,678 B1 | 9/2011 | Bell et al. | |
| 8,087,481 B2 | 1/2012 | Trefz et al. | |
| 8,136,613 B2 | 3/2012 | Schaedler et al. | |
| 8,235,151 B2 | 8/2012 | Nunez et al. | |
| 8,740,229 B2 | 6/2014 | Ellsworth | |
| 8,855,861 B2 | 10/2014 | Goebel et al. | |
| 2008/0184687 A1* | 8/2008 | Scherbring | A01D 34/64 56/10.1 |
| 2008/0277188 A1* | 11/2008 | Hauser | B62D 3/02 180/422 |
| 2013/0282214 A1* | 10/2013 | Goebel | B62D 6/001 701/22 |
| 2014/0262560 A1* | 9/2014 | Dwyer | A01D 34/82 180/6.48 |

* cited by examiner

*Primary Examiner* — Tony Winner

(57) ABSTRACT

A zero turn mower steering system including left and right motion control levers independently pivotable between forward, neutral and reverse positions to rotate left and right rear drive wheels respectively at forward, neutral and reverse speeds. Left and right position sensors on the left and right motion control levers provide electronic signals to an electronic controller that provides a left front wheel steering angle signal and a right front wheel steering angle signal. Each steering angle signal is based on a distance the electronic controller calculates from each of the left and right rear drive wheels to an instantaneous center point of a turn.

15 Claims, 4 Drawing Sheets

ZERO TURN MOWER STEERING SYSTEM

FIELD OF THE INVENTION

This invention relates generally to grass mowing machines, and specifically to a zero turn mower steering system.

BACKGROUND OF THE INVENTION

Grass mowing machines known as zero turning radius ("ZTR") mowers have at least one independently powered rear drive wheel on each side of a frame. Many ZTR mowers have a twin stick control system. A pair of motion control levers or sticks may be provided side-by-side, with each lever or stick controlling one of the rear drive wheels. When both levers or sticks are advanced together forwardly out of their neutral position, both rear drive wheels rotate forwardly to cause the ZTR mower to move forward. A ZTR mower may be steered by advancing one lever or stick more than the other.

Typically, each motion control lever or stick on a ZTR mower maybe linked to a pump arm of one of two separate hydraulic pumps, or of a dual hydraulic pump; i.e., a separate pump for each rear drive wheel. The lever or stick may be used to move a pump swash plate through a direct linkage.

Most ZTR mowers rely on the rear drive wheels for propulsion, steering and braking, while the front wheels are on casters. When a ZTR mower is traversing a slope, the front wheels provide no holding force to the front of the ZTR mower to keep it moving straight across the slope. Instead, to keep the ZTR mower moving straight across the slope, the operator may pull back the motion control lever or stick for the uphill rear drive wheel, so that it acts as a brake and the wheel slides against the ground. As a result, the downhill rear drive wheel may be the only wheel that provides traction. If the downhill rear drive wheel slips, the mower may slide down the hill.

A zero turn mower steering system is needed having front wheels that provide a holding force to the front of the mower to keep it moving straight across a slope and that can enable the mower to maneuver around obstacles located on slopes.

SUMMARY OF THE INVENTION

A zero turn mower steering system includes a pair of motion control levers, with each lever linked to a hydrostatic transmission that rotates a rear drive wheel at a velocity corresponding to the fore and aft position of the lever. A motion control lever position sensor is connected to each lever. Each position sensor provides a signal to an electronic controller based on the fore and aft position of the motion control lever. A pair of front wheels are independently pivoted to steering angles specified by the electronic controller corresponding to any difference between the fore and aft positions of the pair of motion control levers.

DESCRIPTION OF THE PREFERRED EMBODIMENT

Figure 1:
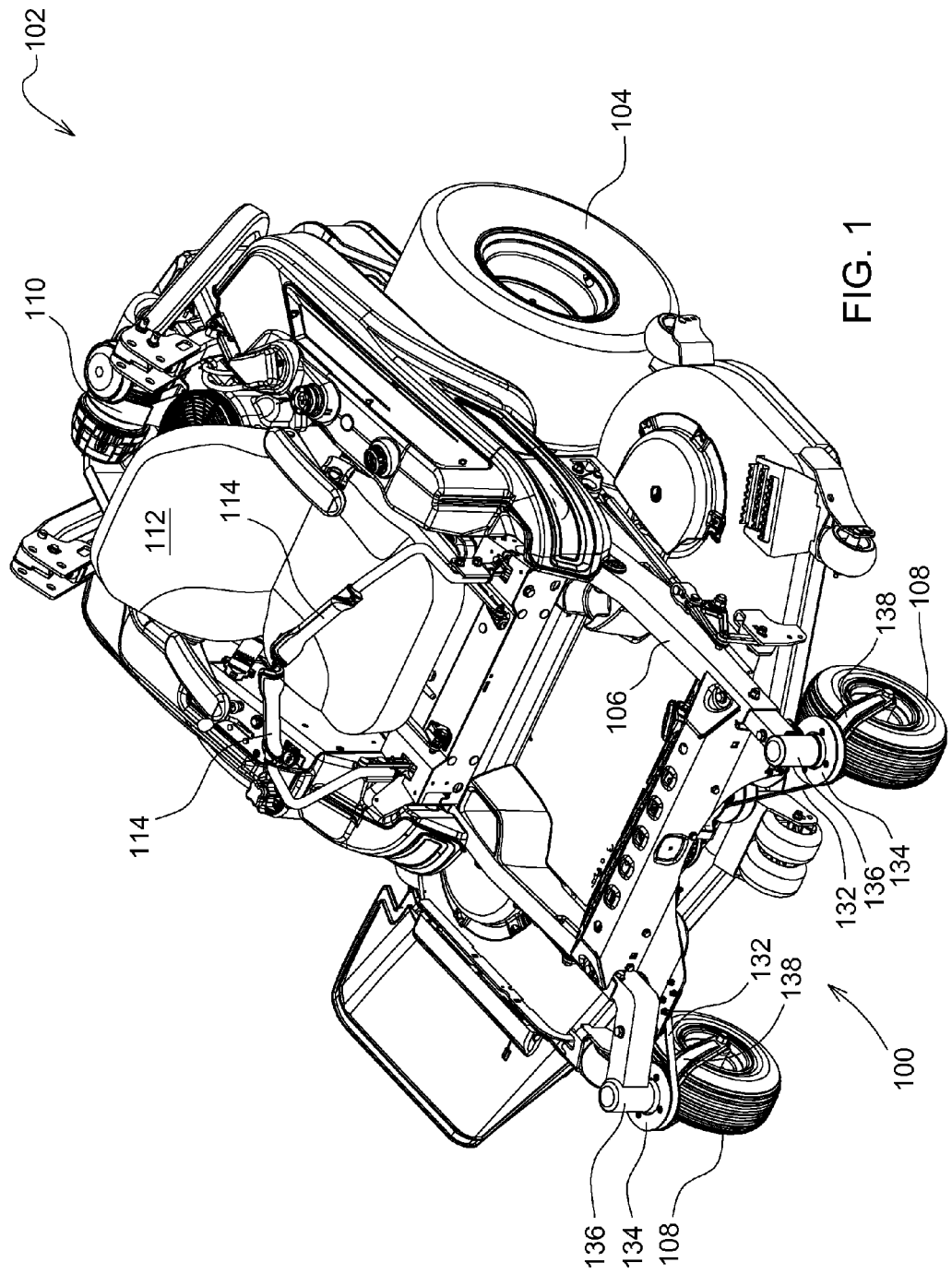
FIG. 1 is a top perspective view of a zero turn mower with a zero turn mower steering system according to one embodiment of the invention.
Figure 2:
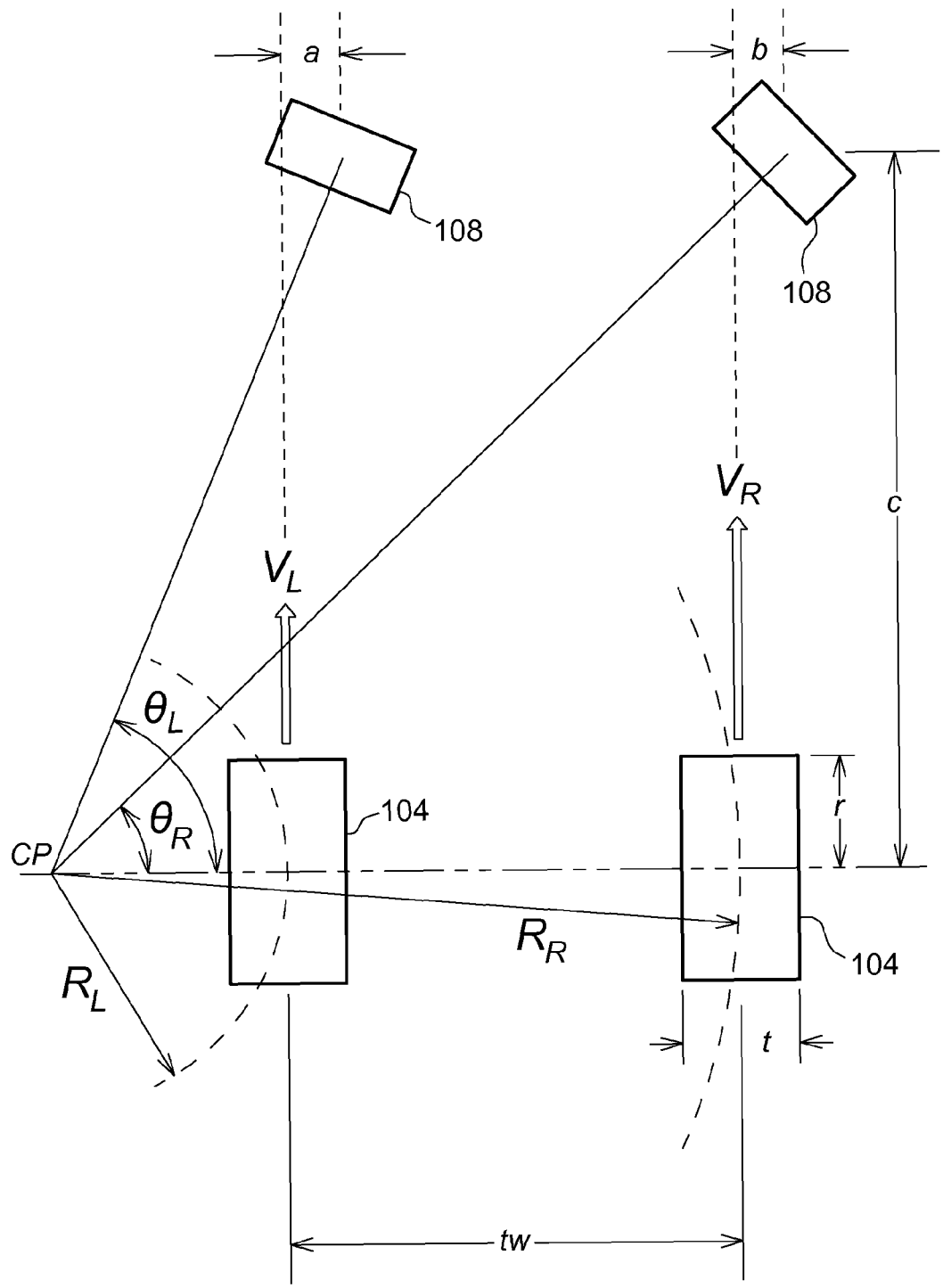
FIG. 2 is a top view of the geometry used for a zero turn mower steering system according to one embodiment of the invention.
Figure 3:
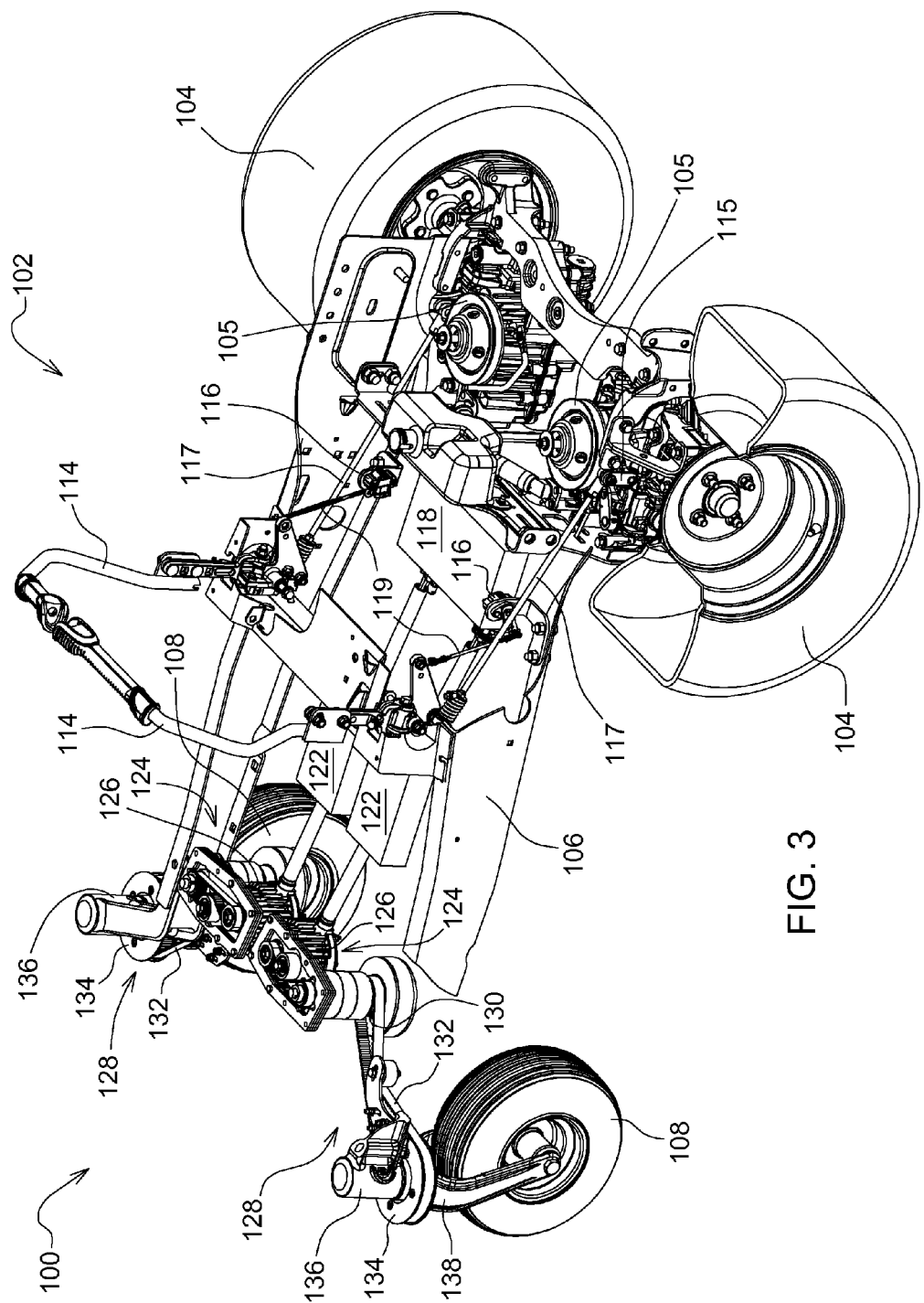
FIG. 3 is a rear perspective view of a zero turn mower steering system mower according to one embodiment of the invention.

FIGS. 1-3 show one embodiment of zero turn mower steering system 100 on ZTR mower 102 having a pair of rear drive wheels 104 that are independently powered so that each rear drive wheel rotates independently of the other rear drive wheel. Each independent drive may include an integrated hydrostatic pump and motor unit 105 coupled to one of the rear drive wheels. Each hydrostatic pump may have a swash plate that may define a pump stroke between a full forward position, a neutral position, and a reverse position. The ZTR mower may have a frame 106 supported on a forward end by front wheels 108, and a rear mounted engine 110 behind operator seat 112. The seat may be mounted over the frame for a seated operator to use left and right motion control levers or sticks 114.

In one embodiment, the left and right motion control levers or sticks 114 are mounted on the ZTR mower and are pivotable between forward, neutral and reverse positions. Each motion control lever or stick may be mounted to the ZTR mower so that the lever may pivot forwardly to move a swash plate 115 in the hydrostatic pump in a first direction to cause a rear drive wheel to rotate forward, or pivot rearwardly to move the swash plate in a second direction to cause the rear drive wheel to rotate backward. Each motion control lever or stick may have a neutral position in which the corresponding rear drive wheel is at rest. The pair of motion control levers or sticks may be mounted adjacent or in front of the operator's seat on a ZTR mower, and may be connected to the hydrostatic pump by a rod 117.

In one embodiment, zero turn mower steering system 100 may include a position sensor 116 for each motion control lever or stick 114. The position sensors may be rotary potentiometers that provide signals that vary with the position of a sensor lever. A rod 119 may connect each motion control lever 114 to its respective sensor lever. Each of the left and right position sensors may provide an electrical signal based on the forward, neutral or reverse position of the motion control lever or stick. The angular velocities ($\omega_L$ and $\omega_R$) of each rear drive wheel 104 may be directly proportional to the position of each motion control lever or stick. Therefore, electrical signals indicating the motion control lever positions may correspond to and provide the same result as rear drive wheel angular velocities.

In one embodiment, zero turn mower steering system 100 may include an electronic controller 118 having a microprocessor that uses the motion control lever position signals, or rear drive wheel angular velocities, to determine the appropriate steering angles ($\theta_L$ and $\theta_R$) for each front wheel 108 of the mower. The controller of the zero turn mower steering system may provide electrical signals to a steering angle controller 122 and/or steering actuator 124 for each front wheel, to pivot the front wheel to a specified angular position and hold the front wheel in that position until the operator moves one or both motion control levers to different positions. The controller may determine an appropriate steering angle of each front wheel that may be the same or different than the appropriate steering angle of the other front wheel. As the controller causes each front wheel to turn to an appropriate steering angle, each front wheel may provide a holding force to the front of the ZTR mower to keep the ZTR mower moving straight across a slope or maneuver on the slope.

In one embodiment, electronic controller 118 may use the positions of the motion control levers or sticks, or the angular velocities ($\omega_L$ and $\omega_R$) of the left and right rear drive wheels, to determine the linear velocities ($V_L$ and $V_R$) of the left and right rear drive wheels, where r is the tire radius, $V_L=r\omega_L$ and $V_R=r\omega_R$.

In one embodiment, the electronic controller in the zero turn mower steering system may use the linear velocities ($V_L$ and $V_R$) of the rear drive wheels, and mower geometry as shown in FIG. 2 and stored in the controller memory, to determine the instantaneous center point CP of each turn. For example, the ZTR mower geometry may include the tread width tw of the mower, which is the distance from the center of the left rear drive tire to the center of the right rear drive tire. The center point also may be referred to as the instantaneous center of zero velocity, and lies on the rear axis of the ZTR mower. Thus, the controller may determine the center point from the center of the left rear tire as $R_L=\text{tw}(V_L/(V_R-V_L))$, and the center point from the center of the right rear tire as $R_R=\text{tw}(V_L/(V_R-V_L)+1))$.

In one embodiment, the electronic controller in the zero turn mower steering system may use the instantaneous center point of rotation, and ZTR mower geometry shown in FIG. 2 and stored in memory, to determine the appropriate steering angles ($\theta_L$ and $\theta_R$) for each front wheel. For example, the ZTR mower geometry may include any offsets (a and b) of the left and/or right front axles or kingpins to one side or the other of the ZTR mower (or offset from the rear drive wheels), and the wheel base c of the ZTR mower, defined as the distance from the rear axle axis to the front axle or kingpin axis. The appropriate steering angle may be the angle that a front wheel's turning axis intersects the center point. The controller may determine the left front wheel steering angle as $\theta_L=\text{arctangent } c/(R_L+a)$ and the right front wheel steering angle as $\theta_R=\text{arctangent } c/(R_R+b)$.

As shown in FIG. 3, in one embodiment, the steering actuators 124 of the zero turn mower steering system may include electric steering motors 126. Mechanical linkages 128 may be provided between each steering actuator and a front wheel 108. For example, each steering angle controller 122 may provide electrical signals to an electric steering motor 126, and each electric steering motor may be connected to a front wheel by mechanical linkage 128.

In one embodiment, the mechanical linkage between the steering actuator 124 and front wheel may include first pulley or sprocket 130 mounted on the output shaft of the steering actuator, a toothed belt 132, and a second pulley or sprocket 134 mounted to fork 138 that supports a front wheel to pivot on vertical spindle 136. Each vertical spindle 136 may be provided with a steering angle position sensor to provide feedback to steering angle controller 122 and/or electronic controller 118. The first pulley or sprocket may include an electrical or mechanical clutch that an operator may use to engage or disengage the zero turn mower steering system.

Figure 4:
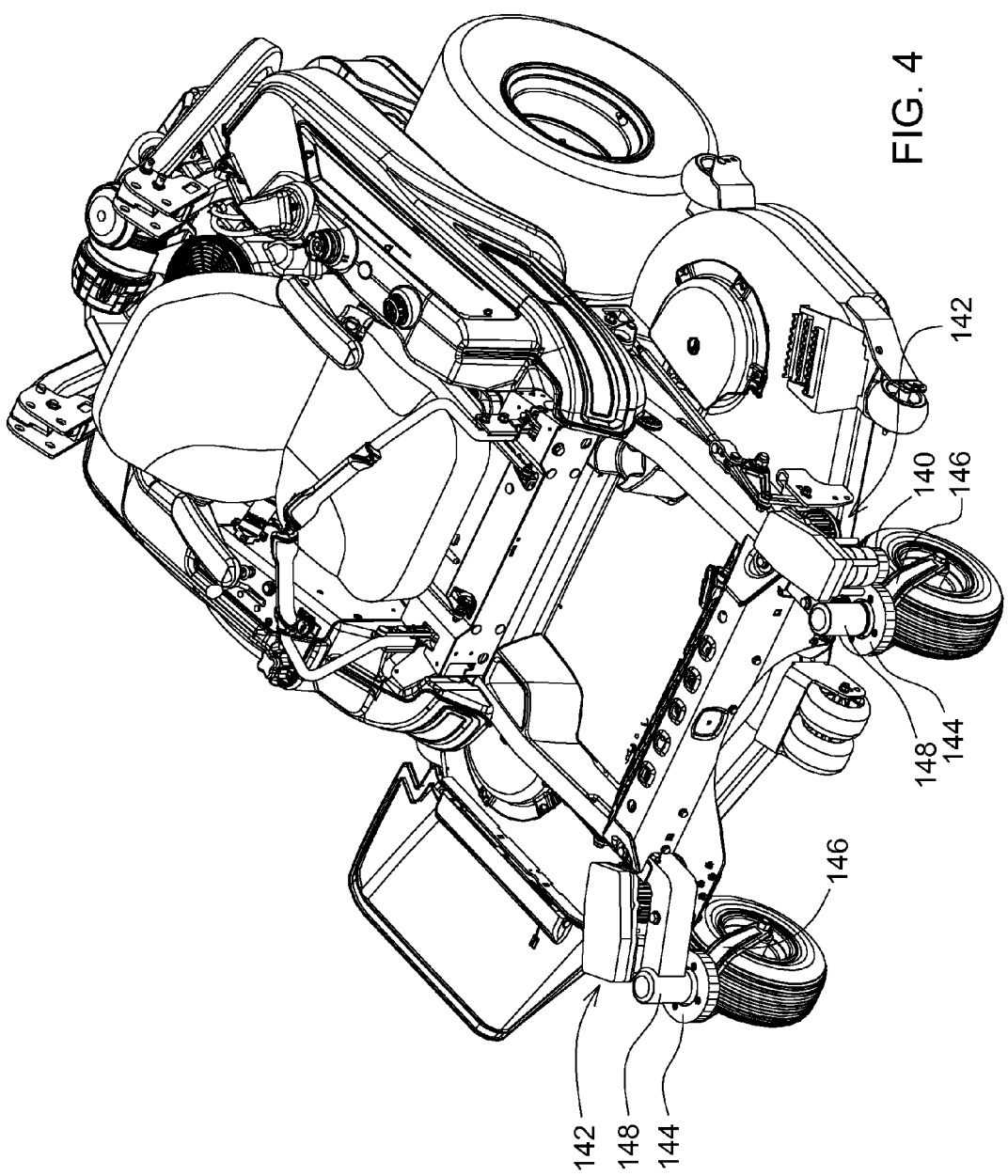
FIG. 4 is a front perspective view of a mechanical linkage of a zero turn mower steering system according to a second embodiment of the invention.

Alternatively, in a second embodiment shown in FIG. 4, the mechanical linkages for each front wheel of the zero turn mower steering system may include a first gear 140 rotated by steering actuator 142, meshing with a second gear 144 mounted to fork 146 that supports the front wheel to pivot on vertical spindle 148.

Having described a preferred embodiment, it will become apparent that various modifications can be made without departing from the scope of the invention as defined in the accompanying claims.

The invention claimed is:

1. A zero turn mower steering system, comprising:
   a pair of motion control levers, each lever linked to a hydrostatic transmission that rotates a rear drive wheel at a velocity corresponding to the fore and aft positions of the lever;
   a motion control lever position sensor connected to each lever; each position sensor providing a signal to an electronic controller based on the fore and aft positions of the lever; and
   a pair of front wheels that are independently pivoted to the steering angles specified by the electronic controller corresponding to any difference between the fore and aft positions of the pair of motion control levers.

2. The zero turn mower steering system of claim 1 wherein the separate steering angles of the front wheels correspond to an instantaneous center point of each turn of the rear drive wheels.

3. The zero turn mower steering system of claim 1 wherein each front wheel is offset to one side of each rear drive wheel.

4. The zero turn mower steering system of claim 1 wherein the electronic controller separately determines a steering angle for each front wheel.

5. The zero turn mower steering system of claim 1 further comprising an electric steering actuator for each front wheel, and a steering controller connected to each steering actuator and the electronic controller.

6. The zero turn mower steering system of claim 5 further comprising a mechanical linkage connecting between each steering actuator and each front wheel.

7. The zero turn mower steering system of claim 6 wherein the mechanical linkage includes a toothed belt on a pair of sprockets.

8. A zero turn mower steering system, comprising:
   left and right motion control levers independently pivotable between forward, neutral and reverse positions to rotate left and right rear drive wheels respectively at forward, neutral and reverse speeds; and
   left and right motion position sensors on the left and right motion control levers to provide electronic signals to an electronic controller that provides a left front wheel steering angle signal and a right front wheel steering angle signal; each steering angle signal based on a distance the electronic controller calculates from each of the left and right rear drive wheels to an instantaneous center point of a turn.

9. The zero turn mower steering system of claim 8 wherein each of the left and right front wheels is offset from each of the left and right rear drive wheels.

10. The zero turn mower steering system of claim 8 further comprising a mechanical linkage and an electric steering actuator between the electronic controller and each of the left and right front wheels.

11. The zero turn mower steering system of claim 8 further comprising a hydrostatic pump controlled by each of the left and right motion control levers.

12. A zero turn mower steering system, comprising:
   a pair of electric steering actuators connected by mechanical linkages to a pair of front wheels; and
   an electronic controller providing angle signals to each of the pair of electric steering actuators based on the fore and aft positions of a pair of motion control levers that independently control the rotational speeds of a pair of rear drive wheels, and on a location of the front wheels relative to an instantaneous center point of each turn defined by the pair of rear drive wheels.

13. The zero turn mower steering system of claim 12 wherein the mechanical linkages include a toothed belt on a plurality of sprockets.

14. The zero turn mower steering system of claim 12 wherein the mechanical linkages include a plurality of gears.

15. The zero turn mower steering system of claim 12 wherein each front wheel is offset from each rear drive wheel.

\* \* \* \* \*